United States Patent
Kemmochi et al.

(10) Patent No.: US 9,237,246 B2
(45) Date of Patent: Jan. 12, 2016

(54) IMAGE PROCESSING APPARATUS, IMAGE PROCESSING SYSTEM, IMAGE PROCESSING METHOD, AND COMPUTER-READABLE STORAGE MEDIUM

(71) Applicants: Eiji Kemmochi, Tokyo (JP); Atsuo Shimada, Kanagawa (JP)

(72) Inventors: Eiji Kemmochi, Tokyo (JP); Atsuo Shimada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 32 days.

(21) Appl. No.: 14/190,217

(22) Filed: Feb. 26, 2014

(65) Prior Publication Data
US 2014/0247463 A1 Sep. 4, 2014

(30) Foreign Application Priority Data

Mar. 1, 2013 (JP) ................................. 2013-040756
Aug. 15, 2013 (JP) ................................. 2013-168980

(51) Int. Cl.
*H04N 1/00* (2006.01)
*G06F 3/14* (2006.01)
*G06F 3/03* (2006.01)

(52) U.S. Cl.
CPC .............. *H04N 1/00381* (2013.01); *G06F 3/03* (2013.01); *G06F 3/14* (2013.01); *H04N 1/00129* (2013.01)

(58) Field of Classification Search
None
See application file for complete search history.

(56) References Cited

U.S. PATENT DOCUMENTS

| | | | |
|---|---|---|---|
| 6,532,349 B1* | 3/2003 | Todome | 399/81 |
| 6,826,724 B1 | 11/2004 | Shimada et al. | |
| 7,194,471 B1 | 3/2007 | Nagatsuka et al. | |
| 7,668,799 B2 | 2/2010 | Nakatomi et al. | |
| 7,958,135 B2 | 6/2011 | Katoh et al. | |
| 2007/0136288 A1 | 6/2007 | Shimada et al. | |
| 2008/0072225 A1 | 3/2008 | Nagatsuka et al. | |
| 2008/0259184 A1* | 10/2008 | Shingu et al. | 348/231.99 |
| 2009/0231637 A1 | 9/2009 | Kemmochi et al. | |
| 2011/0090405 A1* | 4/2011 | Hiroki | 348/705 |
| 2011/0296297 A1* | 12/2011 | Shudo | 715/241 |
| 2012/0008864 A1* | 1/2012 | Kanatsu et al. | 382/176 |
| 2012/0050197 A1 | 3/2012 | Kemmochi | |
| 2012/0062591 A1 | 3/2012 | Omura et al. | |
| 2013/0147736 A1 | 6/2013 | Sakuramata et al. | |
| 2013/0194374 A1* | 8/2013 | Kieft et al. | 348/14.07 |
| 2013/0257905 A1 | 10/2013 | Kemmochi | |
| 2013/0283198 A1 | 10/2013 | Kemmochi et al. | |

FOREIGN PATENT DOCUMENTS

| | | |
|---|---|---|
| JP | 2003-229987 | 8/2003 |
| JP | 2004-102455 | 4/2004 |
| JP | 2005-092538 | 4/2005 |
| JP | 2012-084122 | 4/2012 |

\* cited by examiner

*Primary Examiner* — Fan Zhang
(74) *Attorney, Agent, or Firm* — IPUSA, PLLC

(57) ABSTRACT

An image processing apparatus includes a first display unit that displays a video input on an operation and display unit, a second display unit that displays an input image that is superimposed on the video input displayed on the operation and display unit, and a captured image recording unit that records a captured image of the video input and the input image that are displayed on the operation and display unit. The second display unit erases the input image that is recorded when the captured image recording unit records the captured image of the input image.

11 Claims, 7 Drawing Sheets

IMAGE PROCESSING APPARATUS, IMAGE PROCESSING SYSTEM, IMAGE PROCESSING METHOD, AND COMPUTER-READABLE STORAGE MEDIUM

CROSS-REFERENCE TO RELATED APPLICATIONS

This application is based upon and claims the benefit of priority of Japanese Patent Applications No. 2013-040756 filed on Mar. 1, 2013, and No. 2013-168980 filed on Aug. 15, 2013, the entire contents of which are incorporated herein by reference.

BACKGROUND OF THE INVENTION

1. Field of the Invention

The present invention relates to an image processing apparatus, an image processing system, an image processing method, and a computer-readable storage medium.

2. Description of the Related Art

The so-called "electronic information board" in which a touchscreen panel is mounted on a display is available on the market. The display may be a display using a flat panel, such as a liquid crystal panel or a plasma panel, or a projector. The electronic information board may include a plurality of functions.

The so-called "whiteboard" function, which enables a user to write on the touchscreen panel using a touch-pen or the user's finger, is one of the plurality of functions of the electronic information board. The whiteboard function may display a stroke image, corresponding to a stroke made on the touchscreen panel, on a screen.

Another function of the electronic information board enables the stroke image to be superimposed on a video that is input from a video output apparatus and displayed on the screen. The video output apparatus may be a personal computer, a television camera, or the like that is connected to the electronic information board.

Still another function of the electronic information board enables sharing of images between the electronic information board and another electronic information board via a network.

Examples of related art are proposed in Japanese Laid-Open Patent Publications No. 2005-92538, No. 2012-84122, No. 2004-102455, and No. 2003-229987, for example.

However, according to the conventional electronic information board, when storing together the video that is input from the video output apparatus and displayed and the stroke image that corresponds to the stroke that is made by the user, the video must once be stored as a captured image, and the stroke image must be superimposed on the captured image and stored.

In addition, when the user makes the stroke on the captured image that is displayed, and the video from the video output apparatus is to be displayed thereafter, the display must be switched to the video from the video output apparatus. For example, in a case in which the video is scrolled by a scroll operation on the screen of the personal computer and the stroke is to be made successively on each of the scrolled videos and stored, the switching of the display from one video to another becomes troublesome operation for the user.

SUMMARY OF THE INVENTION

Accordingly, it is a general object in one embodiment of the present invention to provide a novel and useful image processing apparatus, image processing system, image processing method, and computer-readable storage medium, in which the problem described above can be suppressed.

Another and more specific object in one embodiment of the present invention is to provide an image processing apparatus, an image processing system, an image processing method, and a computer-readable storage medium, which can store a video input and an input made by the user, with an improved operability.

According to one aspect of the present invention, an image processing apparatus may include a first display unit configured to display a video input on an operation and display unit; a second display unit configured to display an input image that is superimposed on the video input displayed on the operation and display unit; and a captured image recording unit configured to record a captured image of the video input and the input image that are displayed on the operation and display unit, wherein the second display unit erases the input image that is recorded when the captured image recording unit records the captured image of the input image.

According to another aspect of the present invention, an image processing apparatus may include a video input unit configured to receive a video input; an operation and display unit configured to display the video input from the video input unit; a detecting unit configured to detect a change in existence of the video input from the video input unit; and a display switch unit configured to switch a display on the operation and display unit between a screen page in which an input image is superimposed on the video input that is displayed and a captured page in which the screen page is captured, wherein the display switch unit switches between the screen page and the captured page when the detecting unit detects the change.

Other objects and further features of the present invention will be apparent from the following detailed description when read in conjunction with the accompanying drawings.

DESCRIPTION OF THE PREFERRED EMBODIMENTS

Figure 1:
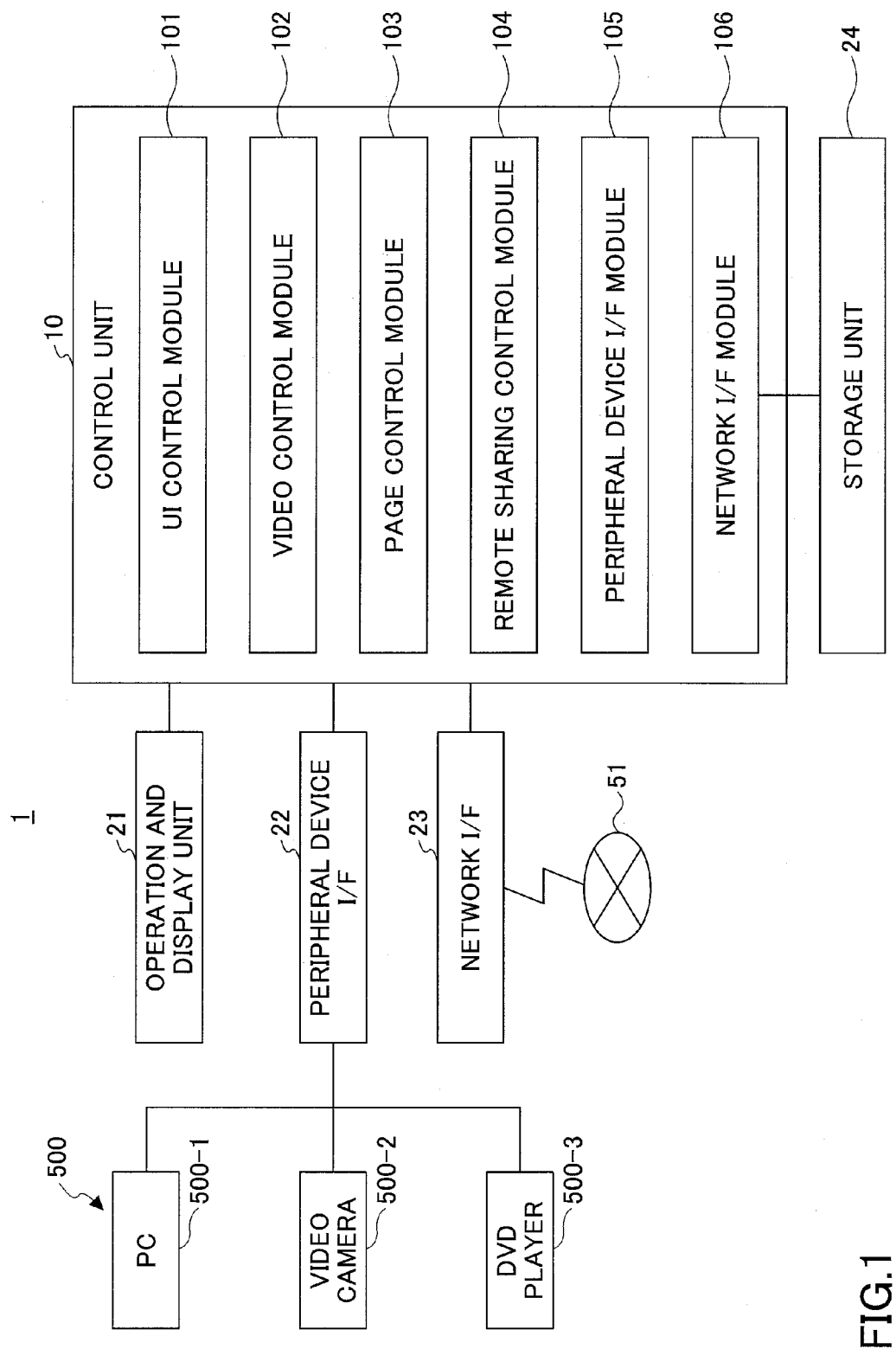
FIG. 1 is a block diagram illustrating an example of a configuration of an image processing apparatus in one embodiment.

A description will be given of embodiments of the image processing apparatus, image processing system, image processing method, and computer-readable storage medium, by referring to the drawings.

FIG. 1 is a block diagram illustrating an example of a configuration of an image processing apparatus in one embodiment. An image processing apparatus 1 illustrated in FIG. 1 may form an electronic information board, a portable terminal, a PC (Personal Computer), or the like, for example.

The image processing apparatus 1 illustrated in FIG. 1 includes a control unit 10, an operation and display unit 21, a peripheral device interface (I/F) 22, a network interface (I/F) 23, and a storage unit 24.

The operation and display unit 21 includes a display function to display information on an operation and display screen, and an input function to input information from the operation and display screen. For example, a liquid crystal display, a plasma display, or the like may provide the display function.

In this example, the operation and display unit 21 may be formed by a touchscreen panel. Methods of sensing touch or input in the touchscreen panel may include the capacitive or electrostatic capacitance method, the resistive or resistive film technology, the SAW (Surface Acoustic Wave) or ultrasonic method, the infrared method, or the like. The user may write on the touchscreen panel using a touch-pen or the user's finger, and an input image corresponding to an input, such as a stroke made by the user using the touch-pen or the user's finger, is sensed by the touchscreen panel. The stroke made by user corresponds to a character, line segment, graphic, or the like freely written by the user, and the stroke image is the character, graphic, or the like that is input by the user. The touch-pen may be provided exclusively for making the input to suit the sensing method employed by the touchscreen panel.

The input image of the input made by the user may include a predetermined image, such as a stamp selected by the user, that is pasted onto a position specified by the user on the touchscreen panel. The input image of the input made by the user may also include a character or the like that is input from a keyboard or the like and is input to a predetermined position on the touchscreen panel. For the sake of convenience, it is assumed in the following description that the "stroke" may include any form of input made with respect to the touchscreen panel using a suitable method, and that the "stroke image" may include any image or writing that is input by the "stroke".

Figure 3:
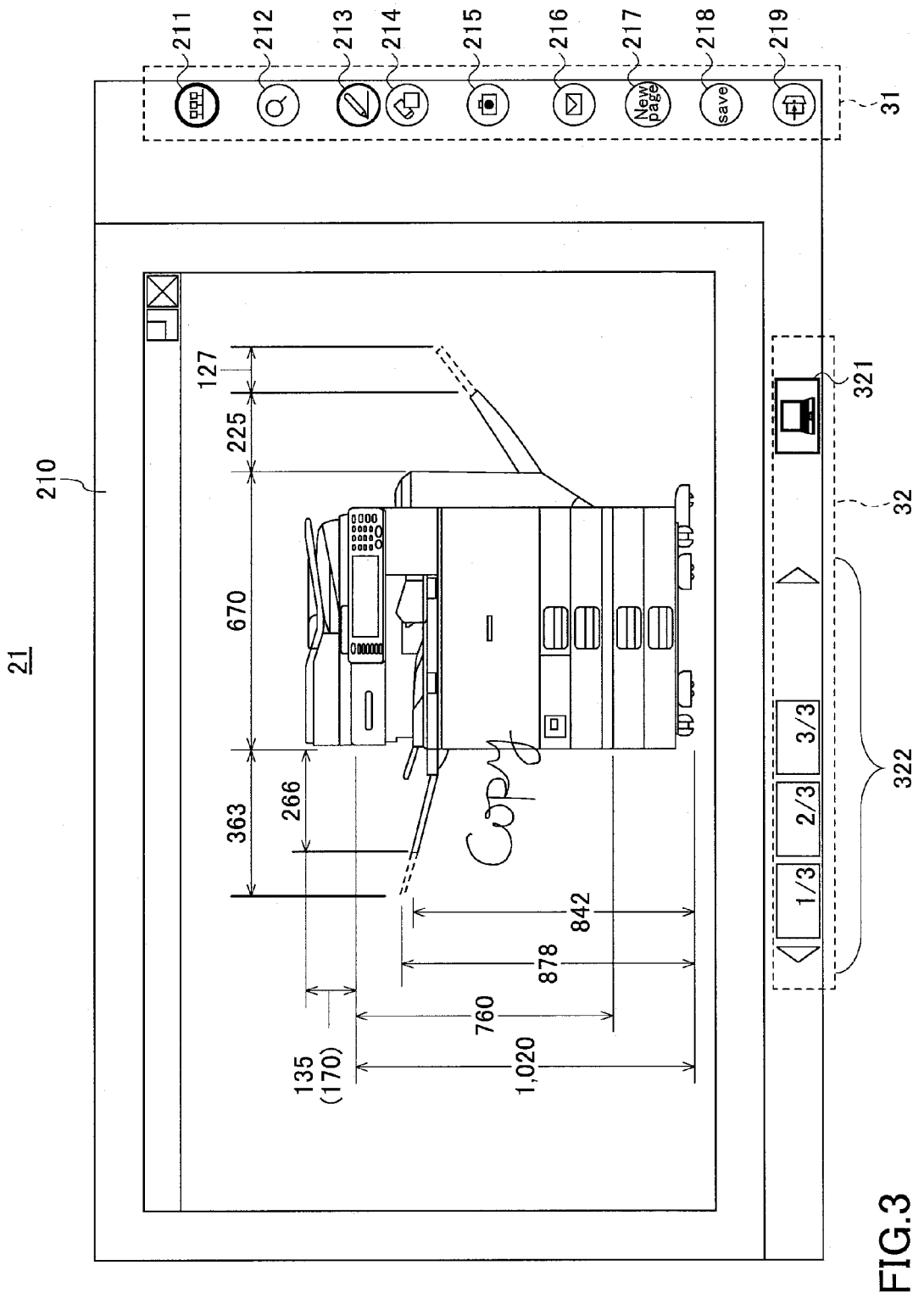
FIG. 3 is a diagram illustrating an example of a stroke written on a screen page.

An example of the display made on the operation and display unit 21 is illustrated in FIG. 3 which will be described later in more detail. In FIG. 3, the operation and display unit 21 includes a main display area 210, a button area 31, and a page list area 32. Each of the main display area 210, the button area 31, and the page list area 32 forms a layer of a hierarchical layer structure. In other words, images of a plurality of layers are superimposed (or overlapped) and displayed on the operation and display unit 21. The button area 31 and the page list area 32 are arranged on the right end and the lower end of the operation and display unit 21, respectively. The button area 31 and the page list area 32 may always be displayed in layers above that of the main display area 210. The layout of the button area 31 and the page list area 32 is not limited to that illustrated in FIG. 3. For example, layout positions, display and non-display settings, and relationships of the layers in the hierarchical layer structure of the button area 31 and the page list area 32 may be modified.

The button area 31 includes a share button 211, a magnify button 212, a pen button 213, a select or delete button 214, a capture button 215, a mail save button 216, a new page button 217, a save button 218, and an end button 219.

The page list area 32 includes a video switch button 321, and a thumbnail display area 322 having a plurality of display regions.

The magnify button 212 instructs enlargement or reduction of the image displayed in the main display area 210. The select or delete button 214 instructs selection of the stroke input by the user, or instructs deletion of the stroke input by the user. The mail save button 216 instructs sending of a captured image by mail. The new page button 217 instructs creation of a new captured page that is blank. The save button 218 instructs all created captured pages to be saved. Functions of other buttons and the operations associated with display areas will be given later.

Returning now to the description of FIG. 1, the peripheral device interface 22 is an example of a video input unit including a video input function to receive video input from a video output device 500, such as a PC 500-1, a video camera 500-2, a DVD (Digital Versatile Disk) player (or deck) 500-3, or the like. Of course, only one of the PC 500-1, the video camera 500-2, and the DVD player 500-3 needs to be provided as the video output device 500 that is connected to the image processing apparatus 1. The peripheral device interface 22 may be a standardized video interface, such as a VGA (Video Graphics Array), DVI (Digital Visual Interface), HDMI (High-Definition Multimedia Interface, registered trademark), or the like. The peripheral device interface 22 may also be a standardized serial bus.

In a case in which the peripheral device interface 22 includes a plurality of ports (not illustrated), a plurality of video output devices 500 may be connected simultaneously to the peripheral device interface 22 via the plurality of ports. Further, the video input from each of the plurality of video output devices 500 may be distinguished from the port of the peripheral device interface 22, and the video input may be switched from one video output device 500 to another video output device 500 by switching the port of the peripheral device interface 22 that is active, for example. For example, the switching of the video input may be made by the user of the image processing apparatus 1.

The network interface 23 includes a function to enable cable or wireless network communication to be performed by the image processing apparatus 1 via a network 51, using a predetermined network communication protocol. The network 51 may be a LAN (Local Area Network) for communication within a limited range, a WAN (Wide Area Network) for communication over a wide range such as the Internet, or the like. For example, the network interface 23 may be formed by a network adapter that enables cable or wireless communication via the network 51.

The network interface 23 enables the image processing apparatus 1 to connect via the network 51 to another image processing apparatus (not illustrated), for example. By connecting to another image processing apparatus, the image processing apparatus 1 may share the video, the stroke image, or the like displayed on the operation and display unit 21, for example. The image processing apparatus 1 and another image processing apparatus that communicate with each other may be a combination of the same type of apparatuses, such as a pair of electronic information boards, for example. In addition, the image processing apparatus 1 and another image processing apparatus that communicate with each other may be a combination of types of apparatuses, such as an electronic information board and a portable terminal, for example.

The storage unit 24 stores captured images, stroke images, registered destinations with whom the image processing apparatus 1 is to communicate, various setting information, or the like. The storage unit 24 may be formed by a HDD (Hard Disk Drive) that uses a hard disk, a silicon disk, a nonvolatile storage device such as a flash memory, or the like. Alternatively, the storage unit 24 may be formed by a region of a main memory (not illustrated) of a CPU (Central Processing Unit, not illustrated). For example, the CPU may form the control unit 10.

The control unit 10 includes a UI (User Interface) control module 101, a video control module 102, a page control module 103, a remote sharing control module 104, a peripheral device interface module 105, and a network interface module 106.

The UI control module 101 controls the display of images to be displayed on the operation and display unit 21. In addition, the UI control module 101 controls control operations of buttons displayed on the operation and display unit 21. The UI control module 101 detects pressing, that is, selection of a button by the touch-pen or the like, and performs a control corresponding to a function associated with the pressed button. When the button is selected by being pressed, a signal indicative of this selection is generated and supplied to the UI control module 101, so that the UI control module 101 may recognize from this signal which button has been selected by the user.

In addition, the UI control module 101 may form an example of a stroke display unit including a stroke display function to control input of the stroke that is input by the touch-pen set by the pen button 213. The UI control module 101 detects the touch (or contact) by the touch-pen or the like to the operation and display unit 21, and records a locus of the touch as the stroke until the touch-pen or the like separates from the operation and display unit 21 from the touched state. The UI control module 101 displays the stroke image of the recorded stroke by superimposing the stroke image on the video that is displayed in the main display area 210 by the video control module 210 to be described later.

Figure 6:
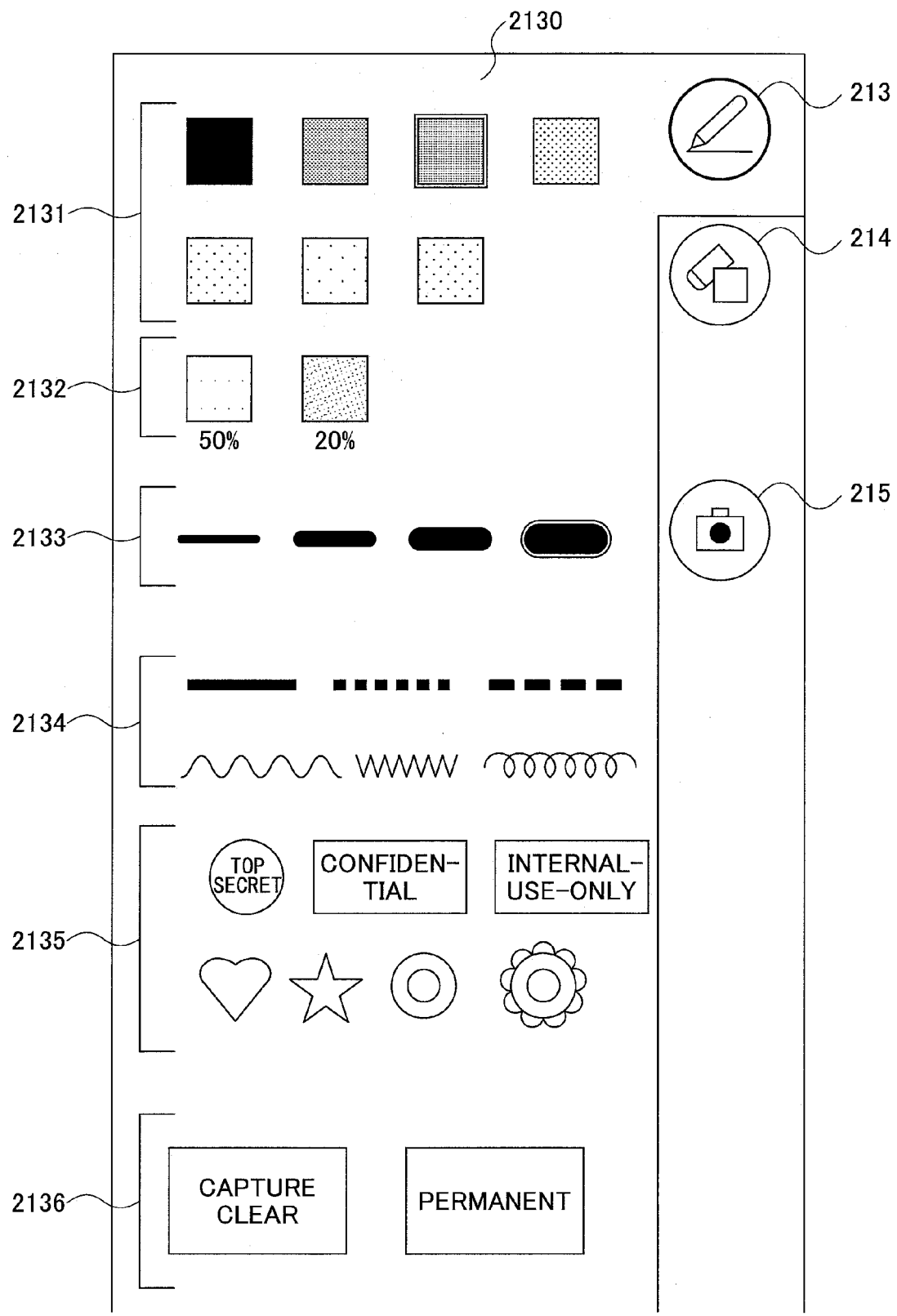
FIG. 6 is a diagram illustrating an example of a detailed setting of a pen button.

A more detailed description will be given of the pen button 213. FIG. 6 is a diagram illustrating an example of a detailed setting of the pen button 213. In FIG. 6, when the pen button 213 is pressed, the UI control module 101 displays a detailed setting screen 2130 on the left side of the pen button 213. The detailed setting screen 2130 displays a color setting 2131, a transparency setting 2132, a line (or stroke) width setting 2133, a line type setting 2134, a stamp setting 2135, and an operation setting 2136.

The color setting 2131 sets the color of the touch-pen. The transparency setting 2132 sets the transparency of the stroke input by the touch-pen. For example, the transparency may be 50% or 20% for semi-transparent, so that a video, such as [MSOffice2], [MSOffice3], or [MSOffice4] (registered trademark), for example, on which the stroke image is superimposed. is visible through the stroke image. The line width setting 2133 sets the line width of the touch-pen. The line type setting 2134 sets the line type of the touch-pen, such as a solid line, a dotted line, a dashed line, a decorated line, or the like. The stamp setting 2135 sets a stamp such as a top secret stamp, a confidential stamp, an internal-use-only stamp, or the like. The operation setting 2136 sets operations to be described later.

The UI control module 101 may save the settings selected on the detailed setting screen 2130 in the storage unit 24, and display the saved settings on the operation and display unit 21.

The UI control module 101 may form an example of a display switch unit including a display switch function to switch the display between the captured page and a screen page. More particularly, the UI control module 101 can switch the display in the main display area 210 between the captured page and the screen page, when the video switch button 321 described above in conjunction with FIG. 3 is pressed. In this embodiment, the "screen page" refers to the page in which the video input from the video output device 500 is input to the image processing apparatus 1 via the peripheral device interface 22. In addition, the "captured page" in this embodiment refers to a page that is captured and recorded when the capture button 215 is pressed while the screen page is being displayed. The thumbnail display area 322 in which thumbnails of captured pages are displayed are arranged at the lower end of the main display area 210 illustrated in FIG. 3. When the user presses (or touches) one of the thumbnails displayed in the thumbnail display area 322, the recorded captured page corresponding to the pressed thumbnail is displayed in the main display area 210. When the video switch button 321 is pressed while the captured page is being displayed, the display in the main display area 210 is switched to the screen page.

In addition, in a case in which a change occurs in the existence of the video input detected by the video control module 102 to be described later, the UI control module 101 may switch the display between the captured page and the screen page depending on the change. Details of the switching of the display will be described later in conjunction with FIG. 7.

The video control module 102 may form an example of a video display unit including a video display function to control the display of the video input to the image processing apparatus 1 from the video output device 500 via the peripheral device interface 22. For example, the video control module 102 may adjust a resolution, aspect ratio, or the like of the video input from the video output device 500, and display the adjusted video in the main display area 210. In addition, the video control module 102 may control the display of a digital video in accordance with the DVI, HDMI, or the like. The video control module 102 may control the display of the video stored in the storage unit 24, or the video received via the network interface 23. For example, the video control module 102 may control the display of a streaming video that is distributed from a video distribution server (not illustrated) and cached in the storage unit 24.

The video control module 102 may form an example of a detecting unit including a detecting function to detect the change in the existence of the video input to the image processing apparatus 1 from the video output device 500 via the peripheral device interface 22. The change in the existence of the video input detected by the video control module 102 may be a change from a no-video input state in which no video is input to the image processing apparatus 1 to a video input state in which the video is input to the image processing apparatus 1, and a change from the video input state to the no-video input state. When the change in the existence in the video input is detected, the video control module 102 sends a state change indicative of the change to the UI control module 101.

The video control module 102 may detect a change in the existence of the video input from another image processing apparatus, that is connected to the image processing apparatus 1 via the network interface module 106 to be described later, and shares the display images with the image processing apparatus 1, by communicating with a network interface module of the other image processing apparatus. The change in the existence of the video input may be added to a predetermined command that is used to transmit and receive the video, for example.

The video control module 102 may form an example of a capture unit including a capture function to capture the video input. More particularly, when the capture button 215 is pressed, the video control module 102 may capture the video that is being displayed in the main display area 210, and generate a captured image (or snapshot) and a thumbnail image thereof. The video control module 102 sends the generated captured image and thumbnail image to the page control module 103.

The page control module 103 controls the screen page and the captured page. More particularly, the page control module 103 may form an example of a captured image recording unit including a captured image recording function to record, in a storage area of the storage unit 24, the captured image generated by the video control module 102 and the stroke image of the stroke written on the main display area 210, as captured pages in correspondence with the layers, in response to an instruction from the UI control module 101 when the capture button 215 is pressed or every time the displayed page is switched. The captured image and the stroke image may be stored in correspondence with the respective layers, by adding an identifier identifying the layer to each of the captured image and the stroke image when storing the captured image and the stroke image in the storage unit 24. An identifier may be added to the captured image of one layer and the same identifier may be added to the stroke images of a plurality of layers and stored, so that each of these layers may be read using the identifier as a key.

The captured page regards the captured image of the screen page as a "video display layer", and the stroke image as a "stroke display layer", and records the captured image and the stroke image in different layers. Accordingly, the stroke image recorded in the captured page can be modified or deleted separately from (or independently of) the captured image of the video displayed on the screen page.

The page control module 103 records, in the storage unit 24, the stroke image together with the captured image, when the capture button 215 is pressed, or every time the displayed page is switched. In addition, the page control module 103 deletes a part or all of the stroke images of the screen page, in order to update the screen page.

Next, a description will be given of functions of the operation setting 2136 of the pen button 213 illustrated in FIG. 6. In this example, the operation setting 2136 may include two kinds of pen settings, namely, capture clear and permanent.

When capture clear is selected, the stroke image of the stroke made by the touch-pen is erased when the capture button 215 is pressed. In the screen page, such as a video clip, a scrollable Web page, a spreadsheet software page including a plurality of sheets, or the like, the video input by the operation of the video output device 500 that is connected to the image processing apparatus 1 may successively change. For this reason, the stroke image that is written and is to be superimposed on the video of the screen page also needs to be changed according to the change in the video of the screen page, and a troublesome operation would be required to delete the stroke image to be deleted while selecting the stroke image to be superimposed on the video of the screen page. On the other hand, according to this embodiment, by setting the operation setting 2136 to capture clear, the stroke image of the stroke that is written is erased from the main display area 210 every time the capture button 215 is pressed, and it is unnecessary to erase the stroke image of the written stroke every time the next stroke is to be written on the screen page.

On the other hand, when the operation setting 2136 is set to permanent, the stroke image of the stroke made by the touch-pen is not erased and remains stored in the main display area 210 when the capture button 215 is pressed. The stroke image made in the permanent setting and the stroke image made in the capture clear setting may coexist in writing to the same screen page. For example, the stroke image of agenda and conference participants, ruled lines of a table to be used as a template, or the like may be written by selecting the permanent setting, and the stroke image of comments according to the screen page may be written by selecting the capture clear setting. In this case, the user may set an erasing target to be erased, from the stroke images in the screen page, by pressing the capture button 215.

The stroke images recorded in the captured page may be recorded in separate layers, or in the same layer, for the capture clear setting and the permanent setting. In addition, the recording of the stroke images in each of the layers may be performed separately from the operation and display unit 21.

In this embodiment, the two kinds of pen settings, namely, capture clear and permanent, may be selected in order to make a setting on whether to erase the stroke image recorded as the captured image from the main display area 210.

Further, the page control module 103 successively reads the plurality of captured images stored in the storage unit 24, in response to an instruction from the UI control module 101, and displays the captured images that are read in the main display area 210 via the UI control module 101.

In addition, when a scroll button (or arrow button) displayed in the thumbnail display area 322 at the lower part of the operation and display unit 21 is pressed, the page control module 103 reads the thumbnails of a next page stored in the storage unit 24, and displays the thumbnails of the next page via the UI control module 101.

The page control module 103 can also duplicate (or copy) and delete the captured page.

The remote sharing control module 104 may form an example of a network control unit including a network control function to control sharing of display images between the image processing apparatus 1 and another image processing apparatus that is connected to the image processing apparatus 1 via the network interface 23. The sharing of the display images is set by pressing the share button 211. The image processing apparatus 1 may be set to be a sharing host by pressing the share button 211. The sharing host may accept access from other image processing apparatuses via the network 51. The remote sharing control module 104 saves authentication information of other image processing apparatuses that are registered in advance, and authenticates a log-in from other image processing apparatuses via the peripheral device interface module 105. Once the log-in is made from the other image processing apparatuses, the display images may be shared among the image processing apparatus 1 and the other image processing apparatuses, and the stroke image made at one image processing apparatus may be shared among these image processing apparatuses including the image processing apparatus 1. In addition, when the share button 211 is pressed and the image processing apparatus 1 is not the sharing host, the image processing apparatus 1 can access another image processing apparatus that is set as the sharing host. The authentication of the log-in or access may be made using a network address, such as an IP (Internet Protocol) address, and a password. Of course, device information, such as a MAC (Media Access Control) address, may be used as authentication information for use in making the log-in or access authentication.

The remote sharing control module 104 ends the communication with the other image processing apparatuses when the end button 219 is pressed. When the image processing apparatus 1 is the sharing host, the image processing apparatus 1 ends the communication with all of the other image processing apparatuses connected via the network 51 when the end button 219 is pressed. In addition, when one of the other image processing apparatuses is the sharing host, the image processing apparatus 1 ends only the communication therein when the end button 219 is pressed.

The peripheral device interface module 105 controls the peripheral device interface 22. The peripheral device interface module 105 performs a format conversion process, a compression or expansion process, a transfer conversion process, or the like on a video signal output from the video output device 500, according to interface specifications of the video output device 500 that is connected to the peripheral device interface 22.

The network interface module 106 controls the network interface 23. The network interface module 106 provides network services with respect to the remote sharing control module 104. For example, the network interface module 106 provides a servlet function with respect to the other image processing apparatuses that are registered in advance by the remote sharing control module 104. The other image processing apparatuses may specify the network address of the image processing apparatus 1 that is set as the sharing host, and use a predetermined password to make a log-in to the image processing apparatus 1. The network interface module 106 establishes a session with the other image processing apparatuses based on the authentication information of the remote sharing control module 104, and assumes a logged in state. The log-in to the sharing host can be made from the plurality of other image processing apparatuses. The session may be ended by an end operation from the other image processing apparatuses, or when a session time-out occurs after a predetermined time elapses from the start of the session. The functions of the peripheral device interface module 105 and the network interface module 106 may be provided by an OS (Operating System) of the image processing apparatus 1.

Figure 2:
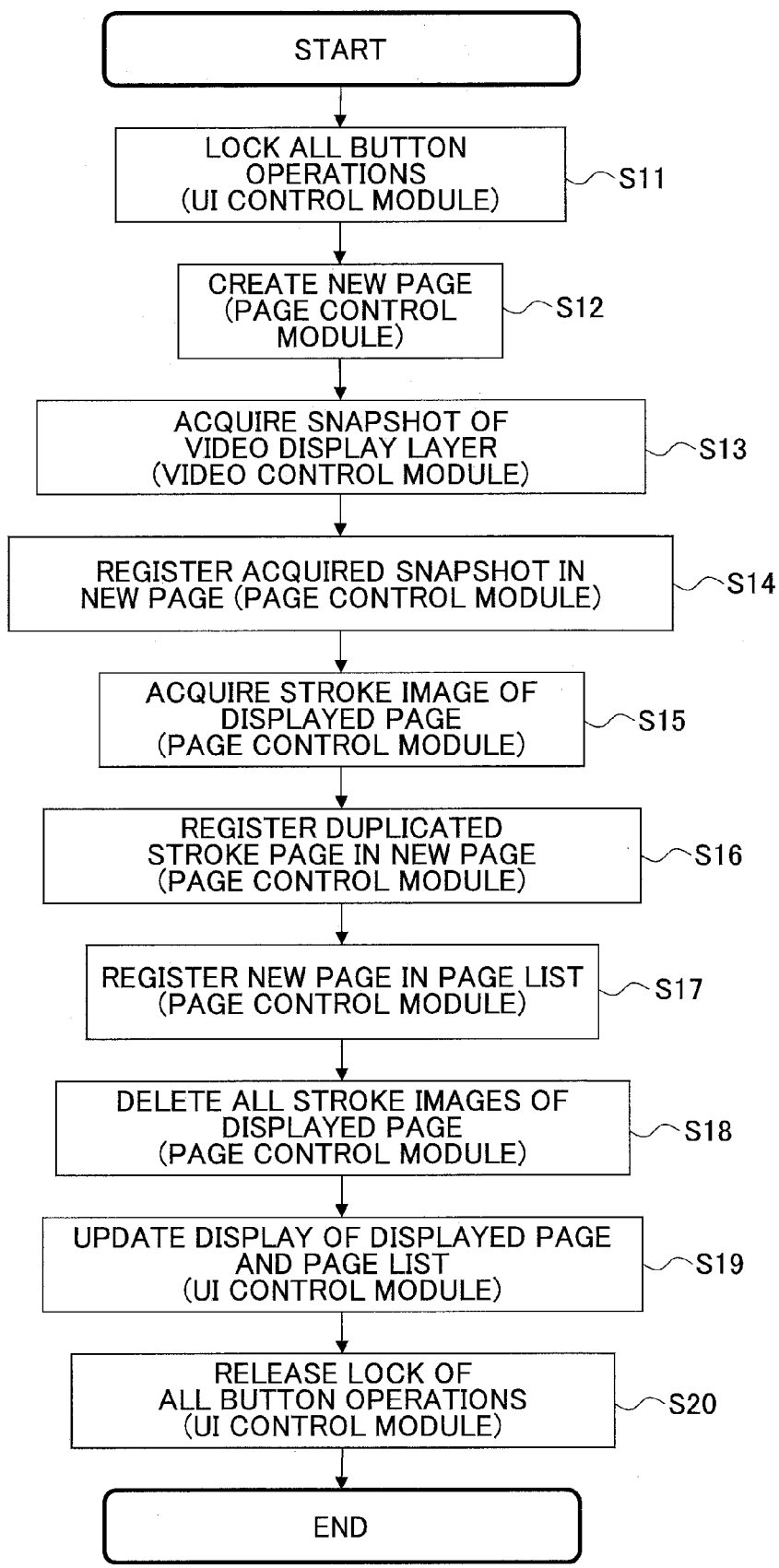
FIG. 2 is a flow chart for explaining an example of a page capture process.

Next, a description will be given of a page capture process of the image processing apparatus 1, by referring to FIG. 2. FIG. 2 is a flow chart for explaining an example of the page capture process.

The page capture process illustrated in FIG. 2 starts when the capture button 215 is pressed in a state in which the screen page is displayed in the main display area 210.

In step S11, the US control module 101 locks all button operations. By locking all button operations, contention among storage areas in the storage unit 24 may be avoided.

Next, in step S12, the page control module 103 creates a new page in the storage unit 24. When the new page is created, a predetermined storage region is provided in the storage unit 24.

Next, in step S13, the video control module 102 generates a snapshot (or captured image) to be registered in the video display layer. The video control module 102 generates the captured image of the video displayed in the main display area 210 at the time when the capture button 215 is pressed. The resolution, number of colors used, or the like of the captured image that is generated may be set via the UI control module 101.

Next, in step S14, the page control module 103 acquires the snapshot generated by the video control module 102, and registers the acquired snapshot in the video display layer of the new page that is created.

Next, in step S15, the page control module 103 acquires the stroke image of the displayed page. The stroke image is the character, graphic, or the like written by the user on the main display area 210. Each stroke image is treated as an object, and the stroke images may be selected or erased in units of objects. For example, a string of characters or the like written in a single stroke of the touch-pen or the like is treated as one object. In addition, one stamp is also treated as one object.

Next, in step S16, the page control module 103 registers a duplicated stroke image in the new page. The page control module 103 records the stroke images of the written strokes in units of objects. The stroke images recorded in units of objects may be grouped by a grouping process when a stroke editing button (not illustrated) is pressed.

Next, in step S17, the page control module 103 registers the new page in a page list. The page list is a list of captured pages that are recorded. The order of the pages, save information of the captured images, save information of the thumbnails, or the like are registered in the page list. The order of display, the thumbnails to be displayed, or the like in the thumbnail display area 322 are determined based on the information contained in the page list.

Next, in step S18, the page control module 103 deletes all stroke images of the displayed page. In this example, it is assumed for the sake of convenience that capture clear is set in the operation setting 2136 illustrated in FIG. 6. The stroke images for the case in which permanent is set in the operation setting 2136 are not deleted in step S18, and are deleted by pressing the select or delete button 214.

Next, in step S19, the UI control module 101 updates the display of the screen page in the main display area 210 and the display of the page list in the thumbnail display area 322. The display of the page list may be made based on the page list that is registered by the page control module 103.

Next, in step S20, the UI control module 101 releases (or unlocks) the lock of all button operations. All button operations can be made and it becomes possible to make the stroke by the touch-pen after step S20.

Next, a description will be given of transitions of the display screen during the page capture process, by referring to FIGS. 3 through 5.

FIG. 3 is a diagram illustrating an example of the stroke written on the screen page. In FIG. 3, a video of a full view of a copying apparatus that is input to the image processing apparatus 1 via the peripheral device interface 22 from the PC 500-1, for example, is displayed as the screen page in the main display area 210. Numerical values associated with the copying apparatus indicate the dimensions of various parts of the copying apparatus in arbitrary units. FIG. 3 illustrates a state in which the user has written a character string "COPY" by the touch-pen or the like in handwriting, by making a stroke on the screen page. In this example, three (3) captured pages are already displayed in the thumbnail display area 322 in this state. The written stroke can be edited by pressing the select or delete button 214, for example.

Figure 4:
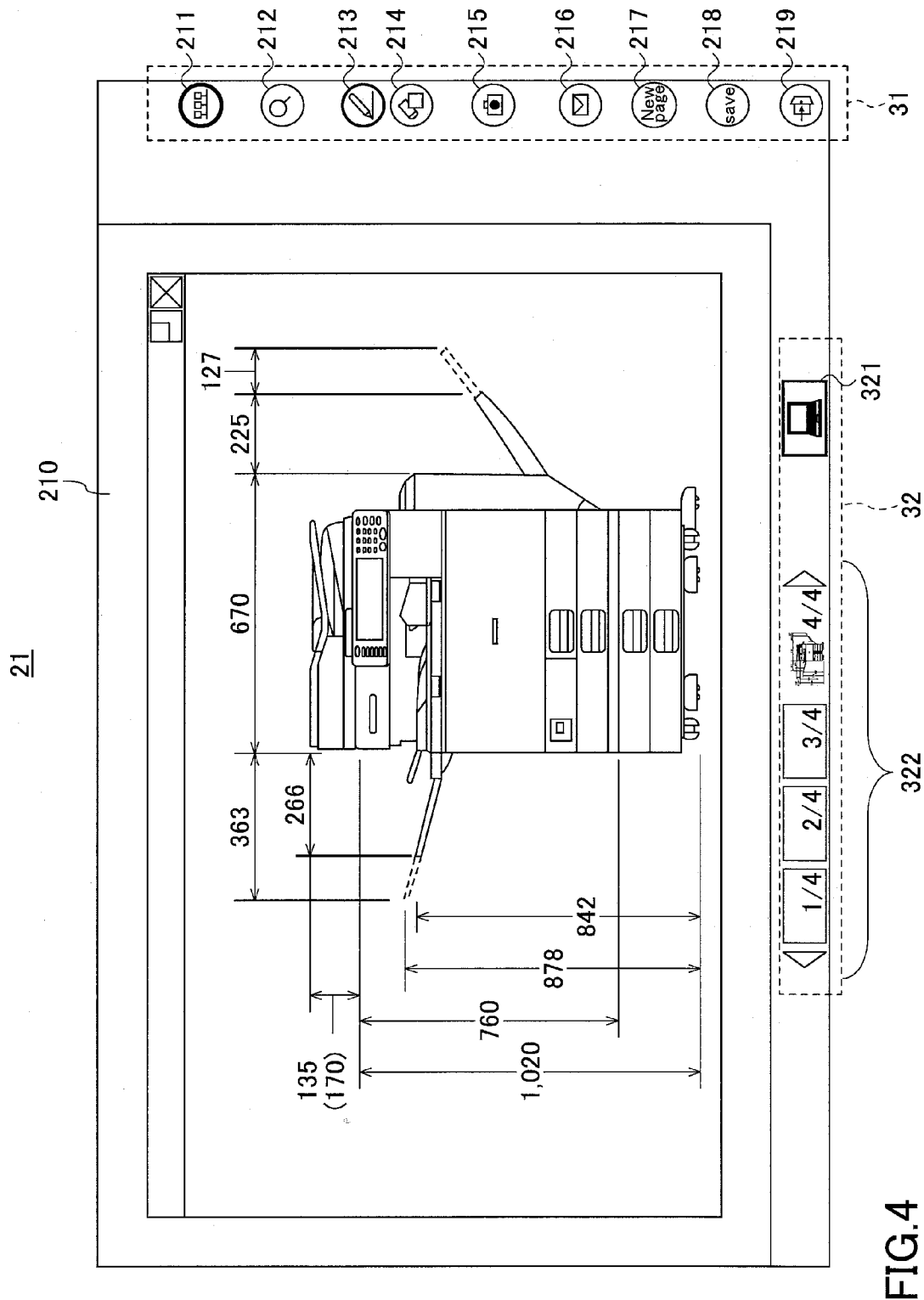
FIG. 4 is a diagram illustrating an example of a captured screen page.

FIG. 4 is a diagram illustrating an example of the captured screen page. A state illustrated in FIG. 4 is obtained when the user presses the capture button 215 in FIG. 3 in a state in which capture clear has been set in the operation setting 2136 by the detailed setting illustrated in FIG. 6.

In FIG. 4, the main display area 210 maintains the display of the screen page. In other words, FIG. 4 illustrates the state in which the stroke may be written on the screen page. All stroke images written in the main display area 210 have already been deleted. Accordingly, the user can continue writing the stroke on the screen page, without having to perform a stroke erase operation. The previously written character string "COPY" is automatically erased from the screen page. For this reason, (i) an operation to write the stroke on the screen page, and (ii) an operation to record the screen page and the captured page of the stroke written on the screen page, can be performed continuously in one operation in response to a single action of the user pressing the capture button 215.

In addition, the thumbnail "4/4" of the captured image is additionally displayed in the thumbnail display area 322. The additionally displayed thumbnail indicates the character string "COPY".

Figure 5:
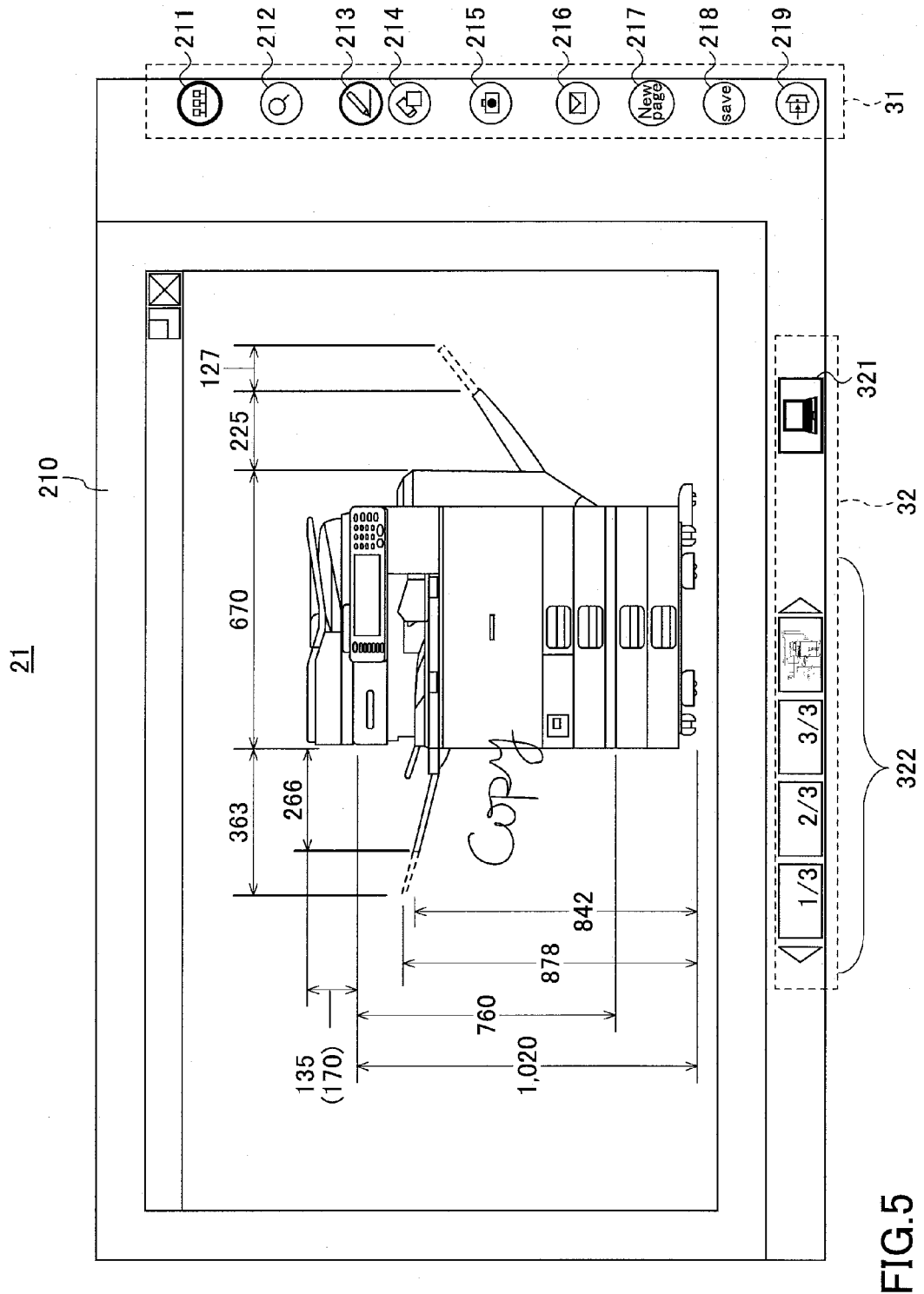
FIG. 5 is a diagram illustrating an example of a captured image that is displayed.

FIG. 5 is a diagram illustrating an example of the captured image that is displayed. A state illustrated in FIG. 5 is obtained when the user presses the thumbnail "4/4" displayed in the thumbnail display area 322 in the state in which the screen page is displayed in the main display area 210 illustrated in FIG. 4.

In FIG. 5, the captured page is displayed in the main display area 210. The captured page displays the screen page, and the stroke image of the stroke that is written on the screen page, at the time when the capture button 215 is pressed, in an overlapping manner. In other words, in the captured page that is displayed, the stroke image is superimposed on the screen page. Hence, the character string "COPY" in handwriting, written by the user described above in conjunction with FIG. 3, is displayed in the captured page. In addition, in FIG. 5, the thumbnail of the capture page that is presently being displayed is displayed in the thumbnail display area 322. The stroke image in the captured page may be added or edited by the touch-pen, for example. The added or edited stroke image is written over the captured page recorded in the storage unit 24 or is saved by renaming a file in the storage unit 24, when making a transition to another page. By pressing the video switch button 321 in the state illustrated in FIG. 5, the display may be switched back to the display of the screen page.

According to this embodiment, the display of the operation and display unit 21 may be shared with other image processing apparatuses that are connected to the image processing apparatus 1 via the network interface 23. The display may be shared among the plurality of image processing apparatuses, including the image processing apparatus 1, by reflecting a display to which an operation is made last on one of the plurality of image processing apparatuses to the other remaining image processing apparatuses with priority over other displays to which other operations are made before on the other remaining image processing apparatuses. In this case, only a difference between the modified display and the previous display may be transmitted among the plurality of image processing apparatuses via the network 51, in order to reduce a load on the network 51.

When the capture button 215 is pressed on the image processing apparatus 1, the page capture process described above in conjunction with FIG. 2 may be performed on another image processing apparatus that is connected to the image processing apparatus 1 via the network 51. When the page capture process is performed in the other image processing apparatus, the captured image may be locally recorded therein in the same manner as the image processing apparatus 1 having the capture button 215 that is pressed, thereby facilitating the editing of the captured page in the other image processing apparatus.

Figure 7:
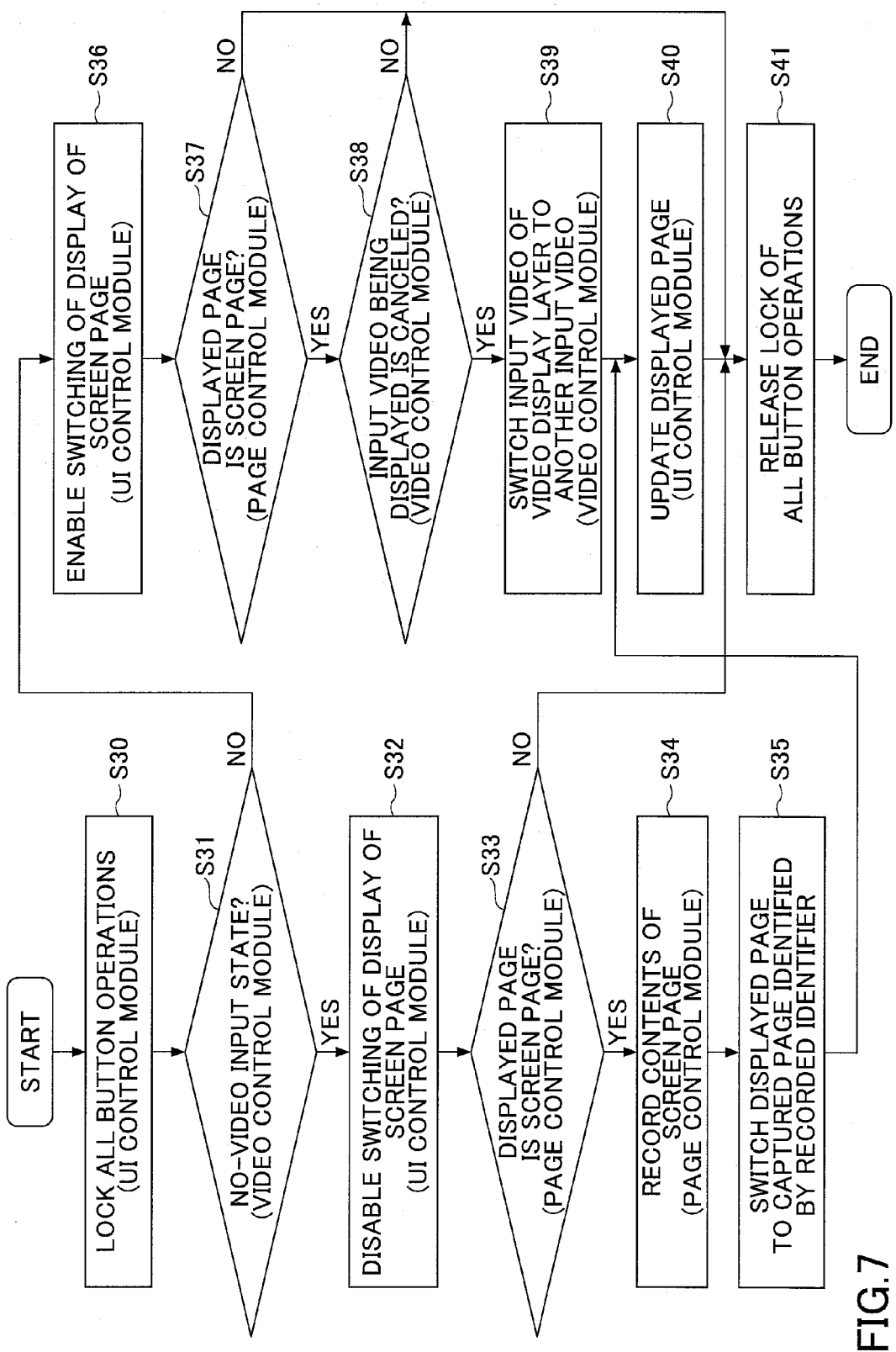
FIG. 7 is a flow chart for explaining an example of a display switching process in a video input state.

Next, a description will be given of the switching between the captured page and the screen page, that is performed by the UI control module 101 when the video control module 102 detects the change in the existence of the video input, by referring to FIG. 7. FIG. 7 is a flow chart for explaining an example of a display switching process in a video input state. The UI control module 101 may form an example of the display switch unit that performs the display switching process, in cooperation with the video control module 102 and the page control module 103.

A case in which the change occurs from the no-video input state to the video input state corresponds to the case in which the video input from the video output device 500 connected to the peripheral device interface 22 starts, for example. In addition, a case in which the change occurs from the video input state to the no-video input state corresponds to the case in which the vide input from the video output device 500 connected to the peripheral device interface 22 ends, for example.

The display switching process illustrated in FIG. 7 starts when the video input state changes.

First, in step S30, the US control module 101 locks all button operations. By locking all button operations, contention among operations may be avoided. The display of the locked buttons may be grayed out, for example, in order to facilitate the user's recognition of the locked buttons.

Next, in step S31, the video control module 102 decides whether the no-video input state is detected. For example, the existence of the video input may be detected from the input signal received from the peripheral device interface 22. In addition, the existence of the video input may be detected by detecting from an input command received from other image processing apparatuses that are connected to the image processing apparatus 1 via the network interface 23 and share the display images with the image processing apparatus 1.

The process advances to step S32 when the no-video input state is detected and the decision result in step S31 is YES. In step S32, the UI control module 101 locks the video switch button 321 in order to disable switching of the display of the screen page. In the no-video input state, the display of the locked video switch button 321 may be grayed out, for example, in order to facilitate the user's recognition of the disabled state of the video switch button 321.

In step S33, the page control module 103 decides whether the displayed page is the screen page. The process advances to step S41 when the displayed page is not the screen page and the decision result in step S33 is NO. In step S41, the UI control module 101 releases the lock of all button operations, and the process ends.

On the other hand, the process advances to step S34 when the displayed page is the screen page and the decision result in step S33 is YES. In step S34, the page control module 103 records contents of the displayed screen page, that is, the video display layer and the stroke display layer in correspondence with the identifiers, in the storage unit 24. By storing the contents of the screen page, the stroke image that is being created can be prevented from being lost even when the switching of the display occurs, for example. The recording of the convents of the displayed screen page in step S34 and the recording of the screen page activated by the pressing of the capture button 215 may be performed by changing file names thereof, for example, so that the two screen pages may be distinguished from each other. In addition, the displayed colors or displayed positions of the thumbnails of the two captured pages displayed in the thumbnail display area 322 may be made different, so that the two screen pages may be distinguished from each other.

Next, in step S35, the page control module 103 switches the displayed page to the captured page that is last displayed and recorded in the storage unit 24, and the process advances to step S40. Each captured page stored in the storage unit 24 is added with the identifier, and the captured image and the stroke image having the same identifier are displayed in correspondence with each other as the captured page. Further, the switching of the display may be made by setting not to display the video display layer for displaying the video.

In order to display the captured page that is last displayed, the identifiers of the displayed captured pages are successively recorded, for example. The page control module 103 can select the last displayed captured page, by selecting the identifier that is recorded last from amongst the successively recorded identifiers.

In step S40, the UI control module 101 updates the displayed page. In step S41, the UI control module 101 releases the lock of all button operations, and the process ends.

On the other hand, the process advances to step S36 when the video input state is detected and the decision result in step S31 is NO. In step S36, the UI control module 101 releases the video switch button 321 in order to enable switching of the display of the screen page.

Next, in step S37, the page control module 103 decides whether the page that is being displayed is the screen page. The process advances to step S38 when the page that is being displayed is the screen page and the decision result in step S37 is YES. In step S38, the video control module 102 decides whether the video input that is being displayed is canceled. For example, the video control module 102 may decide that the video input that is being displayed is canceled when a plurality of video output devices 500 are connected to the plurality of ports of the peripheral device interface 22 of the image processing apparatus 1, and the video input is switched from the video input from one video output device 500 to the video input from another video output device 500. The switching of the video input from one video output device 500 to another video output device 500 may be determined by the user at the image processing apparatus 1, for example. In addition, the order in which the video input is switched amongst the video output devices 500 may be determined according to a default priority setting of the image processing apparatus 1, for example. Thus, the video control module 102 can distinguish between the no-video input state and a state in which the video input is switched from one video input to another, so that the page control module 103 does not record the contents of the screen page when the video input that is being displayed is canceled.

The process advances to step S39 when the video input that is being displayed is canceled and the decision result in step S38 is YES. In step S39, the video control module 102 switches the video input of the video display layer to the video input from another video output device 500. In step S40, the UI control module 101 updates the display of the displayed page. In step S41, the UI control module 101 releases the lock of all button operations, and the process ends.

On the other hand, the process advances to step S41 when the decision result is NO in step S37 or step S38. In this case, the UI control module 101 also releases the lock of all button operations in step S41, and the process ends.

According to the display switching process described above in conjunction with FIG. 7, the screen page and the captured page can be automatically switched according to the change in the video input. In addition, even in a case in which the display is automatically switched to the screen page, the captured page can be automatically recorded to provide a backup of the captured page. Furthermore, in a case in which the no-video input state occurs, the captured page that is last displayed is automatically displayed, in order to eliminate the troublesome operation of having to select the captured page to be displayed.

The functions of the image processing apparatus 1 described above may be provided by an image processing system that is configured via one or more networks using one or more computers, for example.

The embodiment described above can store a video input from a video output device, and an input image of an input made by the user, such as a stroke image of a stroke made by the user, with an improved operability.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP (Wireless Application Protocol) or 3G-compliant phone) and so on. Since the present invention can be implemented as software, each and every aspect of the present invention thus encompasses computer software implementable on a programmable device.

Hence, in the described embodiment, the functions of each of the modules 101 through 106 of the control unit 10 illustrated in FIG. 1 may be implemented using dedicated hardware, or a mixture of dedicated hardware and software. In the latter case, the dedicated hardware may be a computer or a processor, such as a CPU, for example, that executes a computer program (or computer software) to perform the functions of each of the modules 101 through 106. For example, the functions of each of the modules 101 through 106 may be provided by an application program that operates on an OS (Operating System). A medium that stores the application program may be distributed, and the application program itself may be distributed via networks. The application program may be installed in any suitable computer.

The computer program can be provided to the programmable device using any non-transitory computer-readable storage medium for storing processor readable code such as a floppy disk, a hard disk, a CD-ROM (Compact Disk-Read Only Memory), a magnetic tape device or a solid state memory device.

The hardware platform of the disclosed image processing apparatus includes any desired hardware resources including, for example, a CPU, a RAM (Random Access Memory), and a HDD (Hard Disk Drive). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

Further, the present invention is not limited to these embodiments, but various variations and modifications may be made without departing from the scope of the present invention.

What is claimed is:

1. An image processing apparatus comprising:
an operation and display unit configured to provide a display and a plurality of buttons including a capture button that instructs recording of a captured image; and
a processor, coupled to the operation and display unit, and configured to perform a process including
first displaying a video input on the operation and display unit;
second displaying an input image that is input from the operation and display unit and superimposed on the video input displayed on the operation and display unit;

recording, in a storage unit, the captured image of the video input and the input image that are displayed on the operation and display unit, in response to a selection of the capture button; and locking the plurality of buttons provided on the operation and display unit to a disabled state in response to the selection of the capture button, wherein the second displaying erases the input image that is already recorded in the storage unit at a time when the capture button is selected from the operation and display unit in a case in which the image processing apparatus is set to a first operation setting, and maintains the input image that is already recorded in the storage unit at a time when the capture button is selected from the operation and display unit in a case in which the image processing apparatus is set to a second operation setting different from the first operation setting, and wherein the second displaying releases the plurality of buttons that are locked to an enabled state after erasing the input image that is already recorded in the storage unit at the time when the capture button is selected from the operation and display unit in the case in which the image processing apparatus is set to the first operation setting.

2. The image processing apparatus as claimed in claim 1, wherein the recording records the video input and the input image in separate layers of a hierarchical layer structure.

3. The image processing apparatus as claimed in claim 1, further comprising:
a network control unit communicable with another image processing apparatus via a network,
wherein the recording controls the other image processing apparatus to record the captured image of the video input and the input image displayed on the operation and display unit via the network.

4. The image processing apparatus as claimed in claim 1, wherein the processor performs the process further including
switching the display on the operation and display unit from a screen page to a captured page in response to the selection of the capture button in a state in which the screen page is displayed on the operation and display unit,
wherein the video input is displayed on the screen page by the first displaying, and the captured image is displayed on the captured page by the second displaying.

5. An image processing apparatus comprising:
a video input unit configured to receive a video input;
an operation and display unit configured to display the video input from the video input unit on a screen page, and provide a plurality of buttons; and
a processor, coupled to the video input unit and the operation and display unit, and configured to perform a process including
detecting a change in existence of the video input from the video input unit;
locking the plurality of buttons provided on the operation and display unit to a disabled state in response to a detection of the change by the detecting;
switching the display on the operation and display unit between the screen page and a captured page in which an input image that is input from the operation and display unit is superimposed on the video input of the screen page in response to the detection of the change by the detecting, wherein the plurality of buttons include a switch button that instructs switching of the display on the operation and display unit between the screen page and the captured page;
releasing the plurality of buttons that are locked to an enabled state after the switching; and
locking the switch button to a disabled state in response to the detection of the change by the detecting.

6. The image processing apparatus as claimed in claim 5, wherein the switching switches the display to the captured page that is displayed last on the operation and display unit, when the detecting detects a change of the video input to a no-video input state in which no video input is received from the video input unit.

7. The image processing apparatus as claimed in claim 5, wherein the switching records, in a storage unit, the captured page that is being displayed on the operation and display unit and switches the display to the screen page, when the detecting detects a change to a video input state in which the video input is received from the video input unit.

8. The image processing apparatus as claimed in claim 5, further comprising:
a network control unit communicable with another image processing apparatus via a network,
wherein the detecting detects a change in the video input received from the other image processing apparatus via the network.

9. A non-transitory computer-readable storage medium having stored therein a program which, when executed by a computer, causes the computer to perform a process of an image processing apparatus, the process comprising:
first displaying a video input on an operation and display unit that is configured to provide a display and a plurality of buttons including a capture button that instructs recording of a captured image;
second displaying an input image that is input from the operation and display unit and superimposed on the video input displayed on the operation and display unit;
recording, in a storage unit, the captured image of the video input and the input image that are displayed on the operation and display unit, in response to a selection of the capture button; and
locking the plurality of buttons provided on the operation and display unit to a disabled state in response to the selection of the capture button,
wherein the second displaying erases the input image that is already recorded in the storage unit at a time when the capture button is selected from the operation and display unit in a case in which the image processing apparatus is set to a first operation setting, and maintains the input image that is already recorded in the storage unit at a time when the capture button is selected from the operation and display unit in a case in which the image processing apparatus is set to a second operation setting different from the first operation setting, and
wherein the second displaying releases the plurality of buttons that are locked to an enabled state after erasing the input image that is already recorded in the storage unit at the time when the capture button is selected from the operation and display unit in the case in which the image processing apparatus is set to the first operation setting.

10. The non-transitory computer-readable storage medium as claimed in claim 9, wherein the process further comprises:
switching the display on the operation and display unit from a screen page to a captured page in response to the selection of the capture button in a state in which the screen page is displayed on the operation and display unit, wherein the video input is displayed on the screen page by the first displaying, and the captured image is displayed on the captured page by the second displaying.

11. A non-transitory computer-readable storage medium having stored therein a program which, when executed by a computer, causes the computer to perform a process of an image processing apparatus, the process comprising:

displaying a video input on a screen page of an operation and display unit that is configured to provide a display and a plurality of buttons;

detecting a change in existence of the video input;

locking the plurality of buttons provided on the operation and display unit to a disabled state in response to a detection of the change by the detecting;

switching the display on the operation and display unit between the screen page and a captured page in which an input image that is input from the operation and display unit is superimposed on the video input of the screen page in response to the detection of the change by the detecting;

releasing the plurality of buttons that are locked to an enabled state after the switching; and locking a switch button, that is included in the plurality of buttons and instructs switching of the display on the operation and display unit between the screen page and the captured page, to a disabled state in response to the detection of the change by the detecting.

* * * * *